No. 766,154. Patented July 26, 1904.

UNITED STATES PATENT OFFICE.

WINCENTY MATZKA, OF VECHELDE, NEAR BRUNSWICK, GERMANY.

PROCESS OF PREPARING A COMPOSITION FOR SULFUR-BATHS.

SPECIFICATION forming part of Letters Patent No. 766,154, dated July 26, 1904.

Original application filed October 8, 1903, Serial No. 176,286. Divided and this application filed March 8, 1904. Serial No. 197,168.

(No specimens.)

*To all whom it may concern:*

Be it known that I, WINCENTY MATZKA, chemist, a subject of the Emperor of Austria, residing at Vechelde, near Brunswick, Germany, have invented certain new and useful Improvements in Preparations Adapted for the Making of Sulfur-Baths, of which the following is a specification.

By the process described in the United States application Serial No. 176,286 artificial sulfur-bath preparations are obtained by dissolving liver of sulfur in alcohol and adding to this solution essential oils and turpentine, which act as binders against the decomposition of the alcoholic solution. As it has been proved by further experiments, the same effect may be obtained by an easier and cheaper method. By this method it is no more required to employ the expensive pure essential oils, and they may conveniently be replaced by a distillate obtained by distilling the needles of coniferæ with steam.

The mode of carrying out the said method is as follows: When the needles are distilled with steam in order to obtain the essential oils, the liver of sulfur is dissolved in the aqueous distillate containing such oils, and the solution so obtained is shaken up with alcohol. The alcohol will then take up from the aqueous solution the liver of sulfur and essential oils, but will leave behind any foreign matter contained in the liver of sulfur. The alcoholic solution separates from the aqueous solution and two different layers of deposits are formed, the lower one being the water in which the liver of sulfur was formerly dissolved and which now contains the foreign matter, while the latter layer consists of the alcoholic solution of liver of sulfur, which on account of a smaller specific weight than the water separates from the latter. The alcoholic solution of liver of sulfur is then removed from the aqueous solution containing the foreign matter and may be used as it is or further quantities of essential oils may be added, as well as turpentine.

It is to be understood that the aqueous solution of the liver of sulfur must be a concentrated one to obtain the above results.

In the aqueous solution will be dissolved as much liver of sulfur as to saturate the distillate. The saturated solution may be shaken up with such quantities of alcohol (ninety-five per cent. pure) sufficient to obtain an alcoholic solution containing four hundred grams liver of sulfur in one thousand cubic centimeters of alcohol. Two hundred cubic centimeters of the solution thus obtained will make one bath.

The bath is prepared by adding the solution to the bath-water.

What I claim, and desire to secure by Letters Patent of the United States, is—

1. The method of obtaining a preparation suitable for making sulfur-baths, which consists in dissolving liver of sulfur in the distillate obtained by distilling the needles of coniferæ with steam, and shaking this solution with alcohol, thereby causing the alcohol to take up the liver of sulfur and the essential oils from the aqueous solution but leaving behind any foreign matter, substantially as described.

2. The method of obtaining a preparation suitable for making sulfur-baths, which consists in dissolving liver of sulfur in the distillate obtained by distilling the needles of coniferæ with steam, shaking this solution with alcohol, thereby causing the alcohol to take up the liver of sulfur and the essential oils from the aqueous solution but leaving behind any foreign matter, and adding to the alcoholic solution of liver of sulfur additional quantities of the essential oils which act as binders against the decomposition of the alcoholic solution, substantially as described.

3. The method of obtaining a preparation suitable for making sulfur-baths, which consists in dissolving liver of sulfur in the distillate obtained by distilling the needles of coniferæ with steam, shaking this solution with alcohol, thereby causing the alcohol to take up the liver of sulfur and the essential oils from the aqueous solution but leaving behind any foreign matter, and adding to the alcoholic solution of liver of sulfur additional quantities of oil extracted from the needles of coniferæ, substantially as described.

4. The method of obtaining a preparation suitable for making sulfur-baths, which consists in dissolving liver of sulfur in the distillate obtained by distilling the needles of coniferæ with steam, shaking this solution with alcohol, thereby causing the alcohol to take up the liver of sulfur and the essential oils from the aqueous solution but leaving behind any foreign matter, and adding to the alcoholic solution of liver of sulfur additional quantities of oil obtained by distilling the needles of coniferæ with steam, substantially as described.

5. The method of obtaining a preparation suitable for making sulfur-baths, which consists in dissolving liver of sulfur in the distillate obtained by distilling the needles of coniferæ with steam, shaking this solution with alcohol, thereby causing the alcohol to take up the liver of sulfur and the essential oils from the aqueous solution but leaving behind any foreign matter, and adding to the alcoholic solution of liver of sulfur additional quantities of the essential oils which act as binders against the decomposition of the alcoholic solution, and turpentine, substantially as described.

6. The method of obtaining a preparation suitable for making sulfur-baths, which consists in dissolving liver of sulfur in the distillate obtained by distilling the needles of coniferæ with steam, shaking this solution with alcohol, thereby causing the alcohol to take up the liver of sulfur and the essential oils from the aqueous solution but leaving behind any foreign matter, and adding to the alcoholic solution of liver of sulfur additional quantities of oil extracted from the needles of coniferæ, substantially as described.

7. The method of obtaining a preparation suitable for making sulfur-baths, which consists in dissolving liver of sulfur in the distillate obtained by distilling the needles of coniferæ with steam, shaking this solution with alcohol, thereby causing the alcohol to take up the liver of sulfur and the essential oils from the aqueous solution but leaving behind any foreign matter, and adding to the alcoholic solution of liver of sulfur additional quantities of oil obtained by distilling the needles of coniferæ with steam, and turpentine, substantially as described.

In testimony whereof I have hereunto set my hand in presence of the subscribing witnesses.

WINCENTY MATZKA.

Witnesses:
   OLIVIA P. ALBERT,
   MAURICE LILIENFELD,
   EMIL PAFENBRUCH.